US007745959B2

(12) United States Patent
King, Jr. et al.

(10) Patent No.: US 7,745,959 B2
(45) Date of Patent: Jun. 29, 2010

(54) INTEGRATED LIGHTING CONTROL PANEL WITH ANALOG INPUTS/OUTPUTS

(75) Inventors: William A King, Jr., Loganville, GA (US); David M Williams, Alpharetta, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 502 days.

(21) Appl. No.: 11/635,359

(22) Filed: Dec. 7, 2006

(65) Prior Publication Data

US 2008/0084115 A1    Apr. 10, 2008

Related U.S. Application Data

(60) Provisional application No. 60/826,681, filed on Sep. 22, 2006.

(51) Int. Cl.
*H01H 9/54* (2006.01)

(52) U.S. Cl. ..................................... 307/140
(58) Field of Classification Search ............. 307/140
See application file for complete search history.

(56) References Cited

U.S. PATENT DOCUMENTS

| 4,331,914 | A | * | 5/1982 | Huber | 323/324 |
| 4,450,384 | A | * | 5/1984 | Krokaugger | 315/127 |
| 5,045,774 | A | * | 9/1991 | Bromberg | 323/322 |
| 5,289,148 | A | * | 2/1994 | Siglock et al. | 335/202 |
| 5,821,876 | A | * | 10/1998 | Farrington et al. | 340/3.2 |
| 5,905,630 | A | * | 5/1999 | Wetterling | 361/625 |
| 5,990,635 | A | * | 11/1999 | Ference et al. | 315/362 |
| 6,320,732 | B1 | * | 11/2001 | Norman et al. | 361/62 |
| 2004/0075343 | A1 | * | 4/2004 | Wareham et al. | 307/39 |
| 2005/0099131 | A1 | * | 5/2005 | Amarillas et al. | 315/64 |
| 2007/0103835 | A1 | * | 5/2007 | Sorenson | 361/114 |

* cited by examiner

*Primary Examiner*—Robert L. Deberadinis
(74) *Attorney, Agent, or Firm*—Jose de la Rosa (57) ABSTRACT

An electrical distribution system is provided for selectively connecting an electrical power source to load devices comprising a panel and a plurality of switching devices mounted in the panel. Each switching device is electrically connectable between an electrical power source and a load device for selectively delivering electrical power to the load device. A control system controls operation of the switching devices. The control system comprises a programmed controller for commanding operation of the switching devices. The control system includes analog ports for selectively controlling analog load devices.

20 Claims, 6 Drawing Sheets

INTEGRATED LIGHTING CONTROL PANEL WITH ANALOG INPUTS/OUTPUTS

CROSS REFERENCE TO RELATED APPLICATIONS

This application claims priority of provisional application No. 60/826,681 filed Sep. 22, 2006, the contents of which is incorporated by reference herein.

FIELD OF THE INVENTION

This invention relates generally to residential and commercial electrical power distribution panels and components, and more particularly, to a system for providing analog control in an electrical power distribution system.

BACKGROUND OF THE INVENTION

Circuit breaker panels are used to protect electrical circuitry from damage due to an overcurrent condition, such as an overload, a relatively high level short circuit, or a ground fault condition. To perform that function, circuit breaker panels include circuit breakers that typically contain a switch unit and a trip unit. The switch unit is coupled to the electrical circuitry (i.e., lines and loads) such that it can open or close the electrical path of the electrical circuitry. The switch unit includes a pair of separable contacts per phase, a pivoting contact arm per phase, an operating mechanism, and an operating handle.

In the overcurrent condition, all the pairs of separable contacts are disengaged or tripped, opening the electrical circuitry. When the overcurrent condition is no longer present, the circuit breaker can be reset such that all the pairs of separable contacts are engaged, closing the electrical circuitry.

In addition to manual overcurrent protection via the operating handle, automatic overcurrent protection is also provided via the trip unit. The trip unit, coupled to the switch unit, senses the electrical circuitry for the overcurrent condition and automatically trips the circuit breaker. When the overcurrent condition is sensed, a tripping mechanism included in the trip unit actuates the operating mechanism, thereby disengaging the first contact from the second contact for each phase. Typically, the operating handle is coupled to the operating mechanism such that when the tripping mechanism actuates the operating mechanism to separate the contacts, the operating handle also moves to a tripped position.

Switchgear and switchboard are general terms used to refer to electrical equipment including metal enclosures that house switching and interrupting devices such as fuses, circuit breakers and relays, along with associated control, instrumentation and metering devices. The enclosures also typically include devices such as bus bars, inner connections and supporting structures (referred to generally herein as "panels") used for the distribution of electrical power. Such electrical equipment can be maintained in a building such as a factory or commercial establishment, or it can be maintained outside of such facilities and exposed to environmental weather conditions. Typically, hinge doors or covers are provided on the front of the switchgear or switchboard sections for access to the devices contained therein.

In addition to electrical distribution and the protection of circuitry from overcurrent conditions, components have been added to panels for the control of electrical power to loads connected to circuit breakers. For example, components have been used to control electrical power for lighting.

One system used for controlling electrical power to loads utilizes a remote-operated circuit breaker system. In such a system, the switch unit of the circuit breaker operates not only in response to an overcurrent condition, but also in response to a signal received from a control unit separate from the circuit breaker. The circuit breaker is specially constructed for use as a remote-operated circuit breaker, and contains a motor for actuating the switch unit.

In an exemplary remote-operated circuit breaker system, a control unit is installed on the panel and is hard-wired to the remote-operated circuit breaker through a control bus. When the switch unit of the circuit breaker is to be closed or opened, an operating current is applied to or removed from the circuit breaker motor directly by the control panel. Additional, separate conductors are provided in the bus for feedback information such as contact confirmation, etc., for each circuit breaker position in the panel. The control unit contains electronics for separately applying and removing the operating current to the circuit breakers installed in particular circuit breaker positions in the panel. The panel control unit also has electronics for checking the state of the circuit breaker, diagnostics, etc. One advantage of that system is that the individual circuit breakers can be addressed according to their positions in the panel.

As is apparent, the intended function of a power distribution system of the type disclosed is to switch loads on or off. For example, in a lighting control panel, the system can be used to automatically control lighting loads according to desired schedules. However, there is no capability to provide enhanced control features other than basic on/off functions. Instead, a user is required to add separate devices for alternative control functionality, such as dimming of lighting loads.

The present invention is directed to further improvements in electrical distribution panels.

SUMMARY OF THE INVENTION

In accordance with the invention, there is provided an electrical distribution system providing analog control.

In accordance with one aspect of the invention, there is provided an electrical distribution system for selectively connecting an electrical power source to load devices comprising a panel and a plurality of switching devices mounted in the panel. Each switching device is electrically connectable between an electrical power source and a load device for selectively delivering electrical power to the load device. A control system controls operation of the switching devices. The control system comprises a programmed controller for commanding operation of the switching devices. The control system includes analog ports for selectively controlling analog load devices.

It is a feature of the invention that the control system comprises a plurality of analog output ports. Analog output circuits may be connected between the programmed controller and the analog output ports.

It is another feature of the invention that the control system comprises a plurality of analog input ports. Analog input buffers may be connected between the programmed controller and the analog input ports.

It is another feature of the invention that the programmed controller develops a pulse width modulated (PWM) output signal and the analog output circuits convert the PWM signal to a DC voltage.

The analog ports may comprise an analog input port and an analog output port.

It is still a further feature of the invention that the programmed controller controls the analog output port responsive to an analog input command received at the analog input port.

It is still another feature of the invention that the programmed controller controls the analog output port in accordance with a programmed schedule.

It is still a further feature of the invention that the programmed controller selects a select one of the plurality of switching devices to selectively apply power to a select analog load device connected to the analog output.

There is disclosed in accordance with a further aspect of the invention an electrical distribution system for selectively connecting an electrical power source to load devices comprising a panel board having a plurality of load circuit positions. A plurality of pairs of circuit breakers and switching devices are each mounted in one of the load circuit positions. Each pair is electrically connectable between an electrical power source and a load device for selectively delivering electrical power to load devices. An I/O controller mounted in the panel controls operation of the switching devices. The I/O controller comprises a programmed controller for commanding operation of the switching devices. The control system includes analog ports for selectively controlling analog load devices.

Further features and advantages of the invention will be readily apparent from the specification and from the drawings.

DETAILED DESCRIPTION OF THE INVENTION

An electrical distribution system, such as an integrated lighting control system, in accordance with the invention permits a user to control power circuits typically used for lighting, as well as circuits for resistive heating or air conditioning, as well as analog circuits. Control may include on/off switching, dimming and metering. The electrical distribution system may be as is generally described in U.S. application Ser. No. 11/519,727, filed Sep. 12, 2006, the specification of which is incorporated by reference herein.

Figure 1:
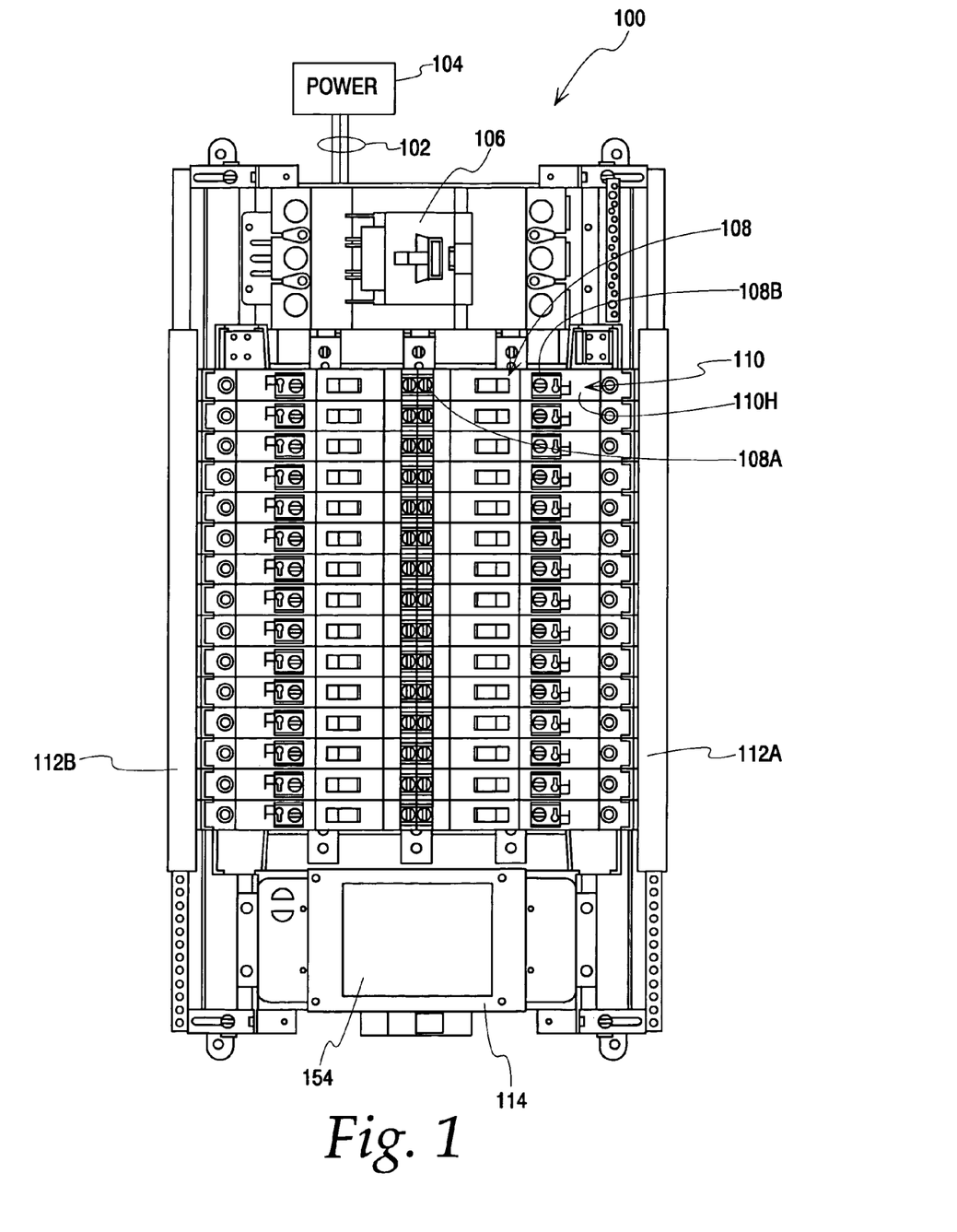
FIG. 1 is an elevation view of a power distribution panel according to the invention.

Referring to FIG. 1, a lighting control system in accordance with the invention comprises a lighting control panel 100. The panel 100 may comprise a Siemens type P1 panelboard, although the invention is not limited to such a configuration. Line power enters the panel 100 through power source cables 102 connected to a source of power 104. Line power may, for example, be a three phase 480Y277, 240 or 120 VAC power source, as is conventional. The cables 102 are electrically connected to an input side of a main breaker 106. The main breaker 106 distributes line power to individual circuit breakers 108 in a conventional manner. How the power is distributed depends on design of the individual circuit breakers 108, as will be apparent to those skilled in the art. The power is distributed to the line side of individual circuit breakers 108. The panel 100 may be configured to accept up to forty-two individual circuit breakers 108, although only thirty are shown in the embodiment of FIG. 1. Each circuit breaker may be of conventional construction and may be, for example, a Siemens BQD circuit breaker. Each circuit breaker 108 includes a line terminal 108A receiving power from the main breaker 106 and a load terminal 108B conventionally used for connecting to a load circuit.

For simplicity of description, when a device such as a circuit breaker 108 is described generally herein the device is referenced without any hyphenated suffix. Conversely, if a specific one of the devices is described it is referenced with a hyphenated suffix, such as 108-1.

In accordance with the invention, each load circuit to be controlled also has a remote operated device 110, such as a relay, a meter or a dimmer. The term remote operated device as used herein includes any other devices that controls, monitors or may otherwise be used in a load circuit, in accordance with the invention. While in a preferred embodiment, the remote operated device 110 is a separate component from the circuit breaker 108, the term "remote operated device" as used herein encompasses devices integral with the circuit breaker. The remote operated devices 110 are also connected to data rails 112A and 112B. A panel controller 114 controls the remote operated devices 110 through connections provided via the data rails 112A and 112B, as discussed below.

The remote operated device 110 includes a housing 110H encasing an auxiliary set of contacts, in the relay embodiment, that can be remotely operated to open and close a lighting circuit. The device 110 is attached to the load side of a circuit breaker 108 within a panel 100 using a conductor tab, i.e, the terminal 110A, inserted into the breaker lug 108B. The load terminal 110B comprises a lug of the same size as the breaker lug 108B for connecting to a wire to be connected to the load device. The device housing 110H is configured to mount in a Siemens type P1 panelboard, although the invention is not limited to such a configuration.

Figure 2:
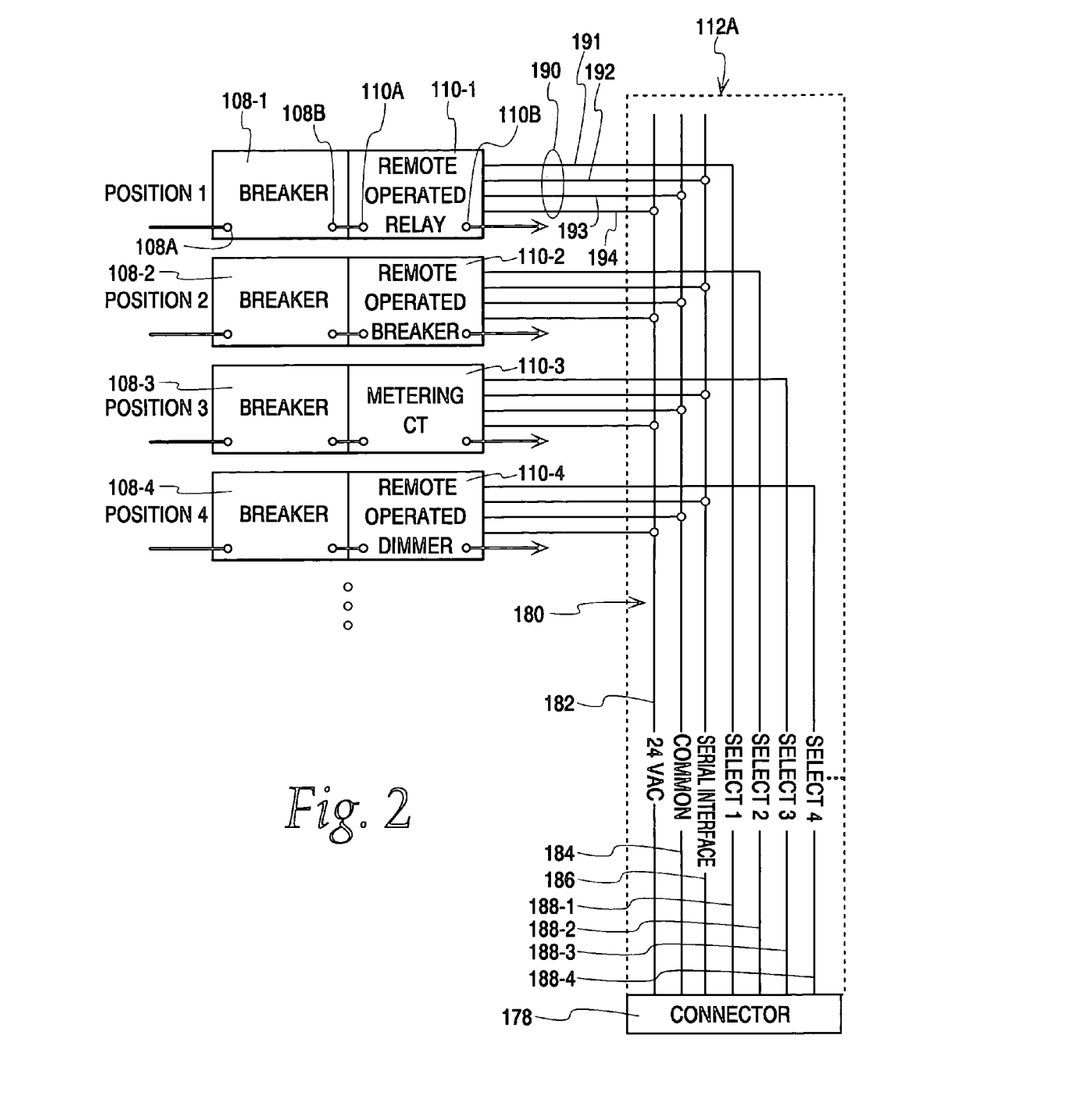
FIG. 2 is a block diagram illustrating pairs of circuit breakers and remote operated devices of the power distribution panel of FIG. 1.

Referring to FIG. 2, a block diagram illustrates four circuit breakers 108-1, 108-2, 108-3 and 108-4, and respective associated remote operated devices 110-1, 110-2, 110-3 and 110-4. In the illustrated embodiment, the first device 110-1 comprises a relay, the second device 110-2 comprises a breaker, the third device 110-3 comprises a current transformer, and the fourth device 110-4 comprises a dimmer. As is apparent, any combination of these remote operated devices 110 could be used. Each remote operated device 110 includes an input terminal 110A electrically connected to the associated circuit breaker load terminal 108B, and an output terminal 110B for connection to a load device.

Figure 3:
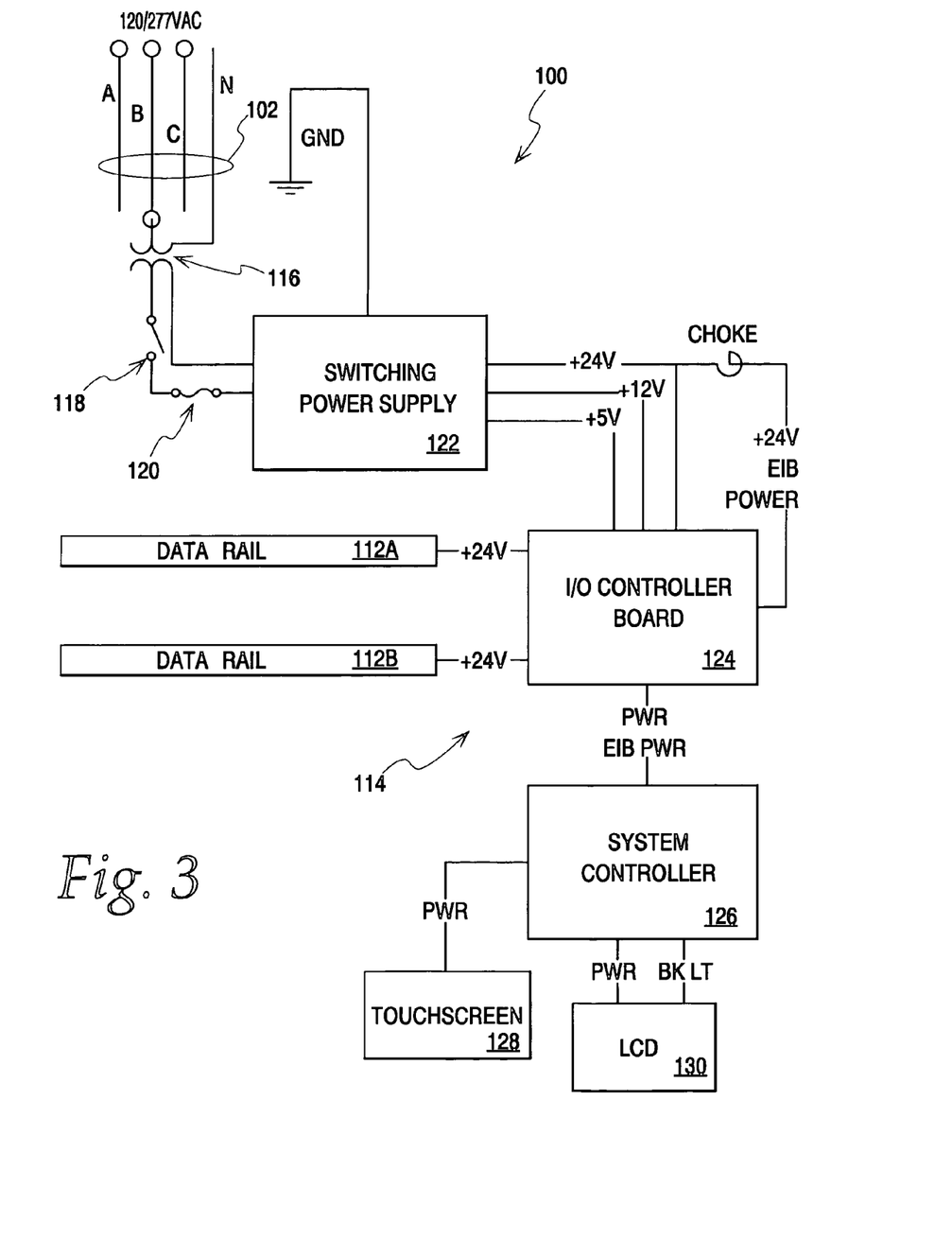
FIG. 3 is a block diagram of the power distribution panel of FIG. 1.

Referring to FIG. 3, a block diagram of the lighting control panel 100 is illustrated. Power from the lines 102 is provided via an isolation transformer 116, power switch 118 and fuse 120 to a switching power supply 122. The panel controller 114 comprises an input/output (I/O) controller 124 and optionally a system controller 126. The power supply 122 provides isolated power to all of the control components including the I/O controller 124, the system controller 126, and the remote operated devices 110, see FIG. 1, via the data rails 112A and 112B. The I/O controller 124 and system controller 126 each have DC-DC converters deriving regulated DC voltage levels as required from the main DC output of the power supply 122. The power supply 122 also provides 24 volts to the remote operated devices 110. The system controller 126 is operatively connected to a touch screen 128 and an LCD 130.

Figure 4:
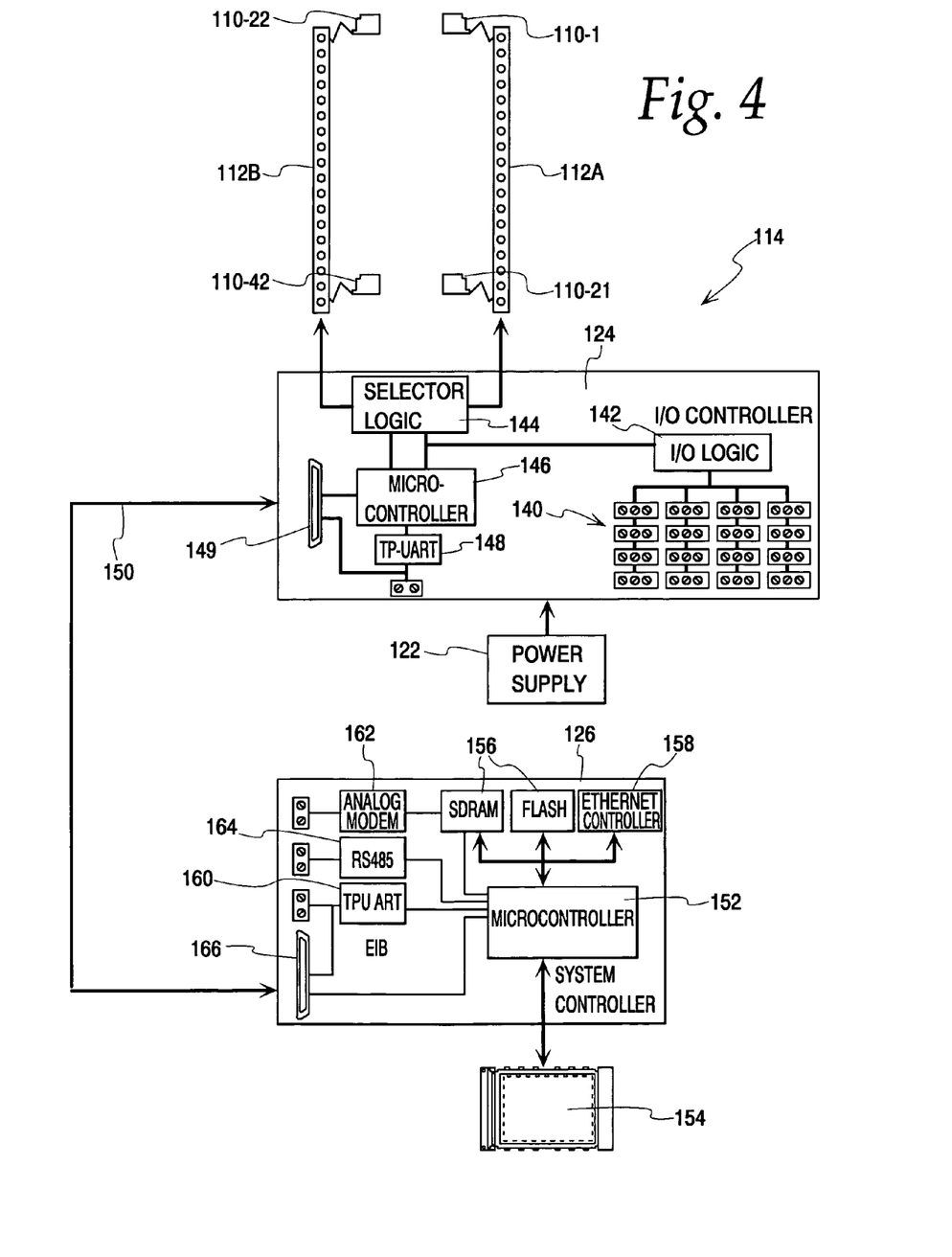
FIG. 4 is an expanded schematic/block diagram of the power distribution panel of FIG. 1.

In one embodiment of the invention, shown in FIG. 4, the panel controller 114 functions as a single panel stand alone system. The I/O controller 124 supplies power and control signals through the rails 112A and 112B to the remote operated devices, four of which, 110-1, 110-21, 110-22 and 110-42, are illustrated. A user interface and high level scheduling and control are provided by the system controller 126.

The I/O controller 124 provides discrete inputs to the controller 114 from dry contact switches, such as wall switches, (not shown) which can be connected to discrete input terminals 140. The terminals 140 are organized as two inputs and a common. The inputs to the terminals 140 are detected by dry contact I/O logic 142. A selector logic block 144 generates selector line signals and serial communications to the remote operated devices 110 via the data rails 112. The logic blocks 142 and 144 are operatively associated with a microprocessor or microcontroller 146. A TP-UART integrated circuit 148 provides an EIB (European Installation Bus) interface. A connector 149 allows mating directly to the system controller 126 via a cable 150.

The system controller 126 provides the user with an application to implement lighting schedules, organize devices into logical groups, manage the inputs, and obtain status information. The system controller 126 includes a microprocessor 152 operatively connected to a user interface 154 in the form of an integrated touch screen 128 and LCD 130, see FIG. 3. The microprocessor 152 is also connected to memory devices 156 and an ethernet controller 158. A TP-UART circuit 160 provides an EIB interface while additional interfaces are provided via an analog modem 162 and RS 485 interface circuit 164. A connector 162 is provided for connection to the cable 150 to communicate with the I/O controller 124.

Referring again to FIG. 2, a data rail 112 is illustrated schematically. The data rail 112 is mechanically attached directly to the interior of the lighting control panel 100. The data rail 112 comprises a shielded communication bus including a ribbon connector 178 having twenty-five to twenty-nine wires to be routed to the I/O controller board 124. The ribbon connector 178 typically has twenty-six wires, two for power connection, two for ground connection, one for the serial line and up to twenty-one select lines, one for each remote operated device 110. Each data rail 112 provides a barrier to isolate the class 1 load wires from the class 2 signal wires used to manage the devices 110. The data rails 112 will connect to each device 110 via a connector that extends out of the device 110. The wires are connected to a printed circuit board 180 included traces defined as follows. A power trace 182 provides 24 volt DC power to each remote operated device 110. A common trace 184 provides a ground to each remote operated device 110. A serial interface trace 186 provides serial communication to each of the remote operated devices 110. A plurality of select line traces, four of which 188-1, 188-2, 188-3 and 188-4 are illustrated, are provided, one for each remote operated device 110. Each remote operated device 110 includes a four wire cable 190 for connection to the data rail 112. The four wires comprise a select line 191 connected to one of the select traces 188, a serial interface line 192 connected to the serial interface trace 186, a neutral wire 193 connected to the common trace 184 and a power wire 194 connected to the power trace 182.

In accordance with the invention, a unique select line is assigned to each breaker 108/remote operated device 110 pair positioned within the lighting control panel 100. Select lines are used by the I/O controller 124 to select single remote operated devices to communicate via the serial interface trace 186. For example, when the first select line 188-1 is asserted, the first remote operated device 110-1 listens for messages on the serial interface line 186. Conversely, messages on the serial interface 186 are ignored if the first select line 188-1 is not asserted. A response by any of the remote operated devices 110 to a serial command is therefore conditional on whether its particular select line is asserted. The term "asserted", as used herein, means one state of a signal designated to cause the remote operated device to listen for messages. In a preferred embodiment, the select line has "high" and "low" states, the high state being the asserted state.

The remote operated device 110, in the form of a relay, allows remote switching of an electrical branch load. The device 110 is designed to fit inside a standard electrical panel board with up to forty-two branch circuit breakers 108. The device 110 is an accessory to a branch circuit breaker 108 allowing repetitive switching of the load without effecting operation of the circuit breaker 108.

Figure 5:
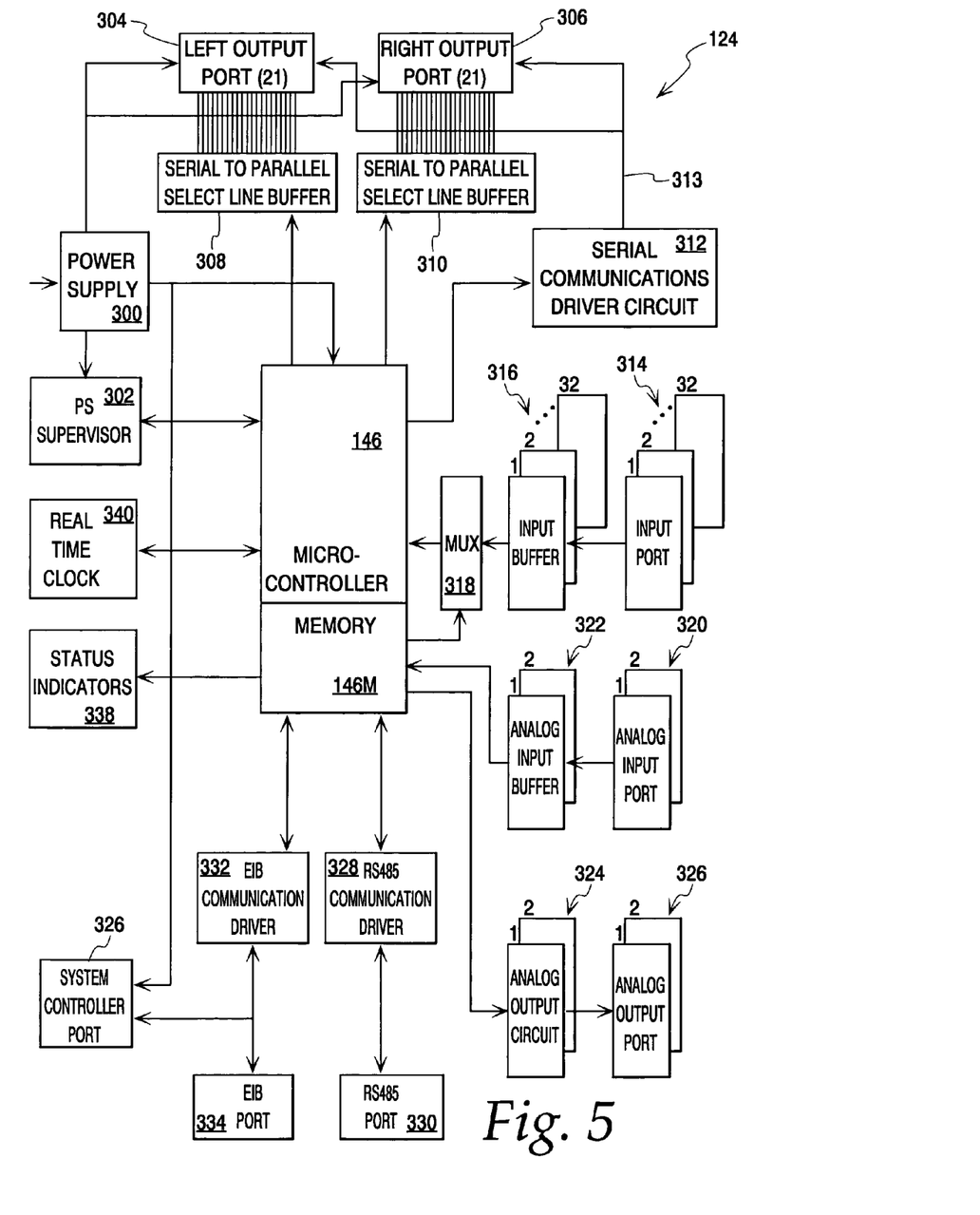
FIG. 5 is a detailed block diagram of the I/O controller of FIG. 3.

Referring to FIG. 5, the circuitry for the I/O controller 124 is illustrated in greater detail in block diagram form. The I/O controller 124 is powered from the external power supply 122, see FIG. 3, that feeds a power supply 300. The power supply 300 produces the voltages needed by the microcontroller 146 and all the other circuits making up the I/O controller 124. The microcontroller 146 may, for example, comprise a TI MSP430 microcontroller and associated memory 146M, such as flash memory or ROM memory, for storing operating programs and data, as is conventional. A power supply supervisor 302 monitors voltage and sends a reset to the microcontroller 146 if a voltage falls out of tolerance. The forty-two outputs for the individual remote operated devices 110, see FIG. 2, are divided into twenty-one left side outputs at a left output port 304 and twenty-one right side outputs at a right output port 306. Serial to parallel select line buffers 308 and 310 develop separate select or enable signals for each output device 110 from the microcontroller 146 to the respective output ports 304 and 306. The two serial to parallel blocks 308 and 310 are identical so that the same clock can drive both sides, further reducing output pins needed from the microcontroller 146.

A serial communication driver circuit 312 is used to isolate and drive a single wire serial communication line 313 from the microcontroller 146 to the output ports 304 and 306. Voltage and ground from the power supply 300 are also connected to the output ports 304 and 306. The single wire communication line 313 connects to each remote operated device 110, as described above, to transmit and receive commands and data. The serial communication driver circuit 312 provides necessary isolation and protection such that in the event of an individual remote operated device failure, the remainder of the devices continue to operate properly.

The I/O controller 124 has thirty-two discrete inputs connected to input ports 314. Each input port 314 is individually protected, conditioned, and buffered at input buffers 316 connected to the microcontroller 146 via a multiplexer 318 to allow reading eight inputs at a time. Since an input can be connected to a variety of devices, such as several different types of switches and occupancy sensors from different manufacturers, each input is read under different conditions controlled by the microcontroller 146. By reading the input twice, once with the input bias high and then again with the input bias low, the microcontroller 146 can determine a change of state regardless of whether the input is a switch contact or a positive DC voltage.

A pair of analog input ports 320 are used for reading analog inputs, such as photocells or potentiometers. The ports 320 consists of a three terminal connection, two analog inputs on the outside with a ground terminal in the center. The analog inputs are individually buffered at analog input buffers 322 and routed to analog inputs of the microcontroller 146. Analog outputs from the microcontroller 146 are created by sending a pulse width modulated (PWM) signal to a pair of analog output circuits 324. The analog output circuits 324 converts the PWM signal to a DC voltage corresponding to the duty cycle of the PWM. The outputs are then connected to analog output port 326. The analog output ports 326 may comprise three terminals with the two analog outputs connected to the two outside terminals with a ground terminal in the center.

The illustrated I/O controller 124 includes two means of a communication. The first is a master/slave protocol using an RS485 communication drive 328 with configurable termination and bias connected to an RS485 port 330. The RS485 port 330 has both an in and out connectors for daisy chaining RS485 connections. The second form of communication is an EIB or Konnex distributed processing protocol using an EIB communication driver 332 connected to an EIB port 334. The EIB port 334 is a two pin connection for attaching a twisted pair connector. In addition, the EIB communication lines are connect to a system controller port 336 along with voltage from the power supply 300. This port is used to communicate with the system controller 126 via the cable 150 connected to the connector 148, see FIG. 4, discussed above. As discussed above, the system controller 126 configures a system of multiple panels, sets up time schedules, maps inputs to outputs, and provides other building automation functions.

The microcontroller 146 can send signals to various types of status indicators 338 such as LEDs to show communications OK, operating properly, low voltage, etc. If a time schedule has been configured in the I/O controller 124, a real time clock 340 provides the ability to activate outputs based on time of day without intervention from a system controller 126 or other building automation system.

The present invention is part of a lighting control system consisting of the panelboard 100 with the main circuit breaker 106, multiple branch circuit breakers 108 and multiple remote operated devices 110. The remote operated devices 110 are controlled by the panel controller 114, particularly the I/O controller 124, via the data rails 112A and 112B. The primary application for the panel 100 is to control lighting loads. Conventionally, this requires switching the loads on and off. In addition, the control system includes the I/O controller 124 having the capability to perform analog control, such as dimming of lighting loads, as well as switching.

Figure 6:
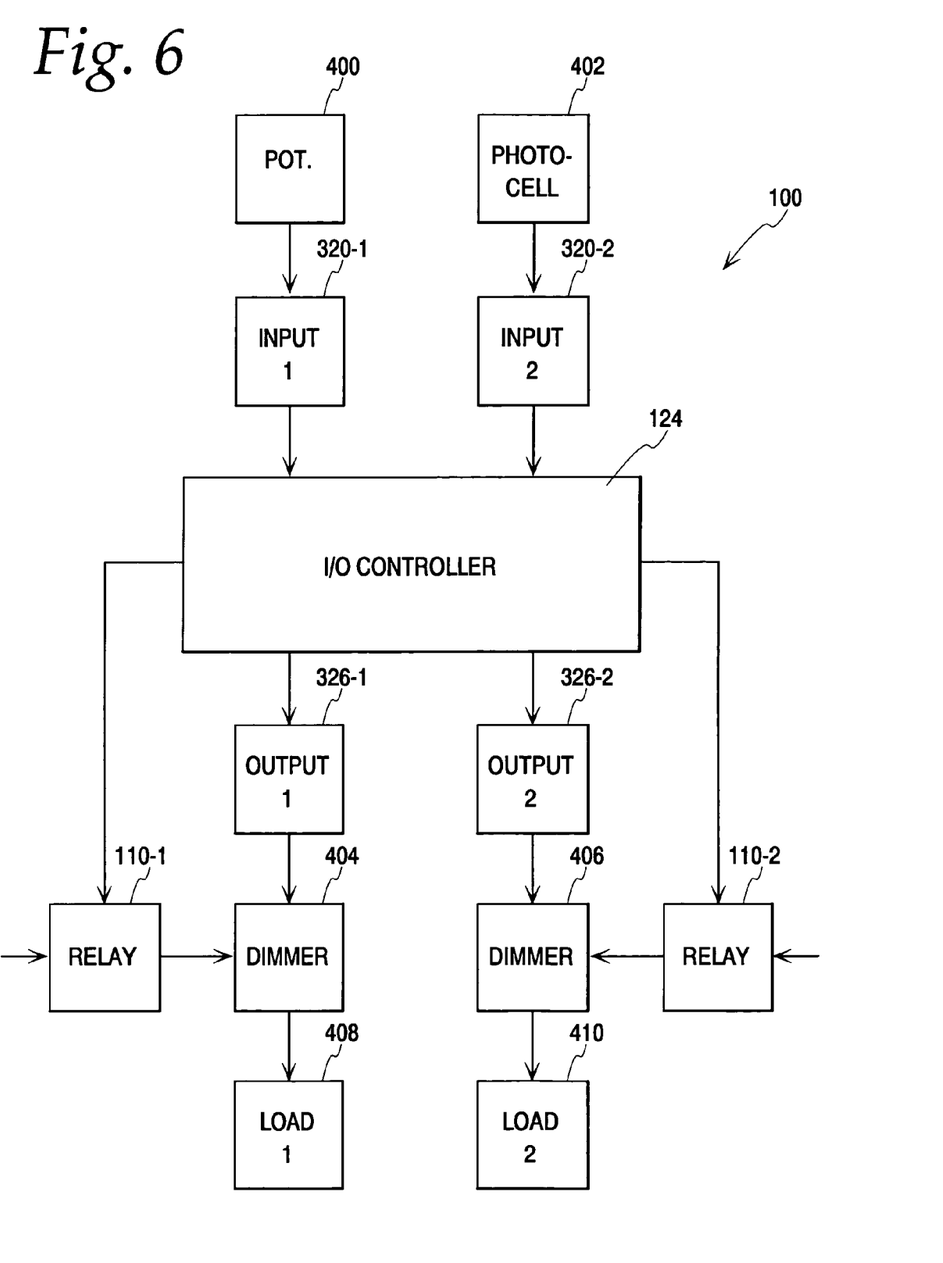
FIG. 6 is a block diagram of the I/O controller of FIG. 5 in an analog load control circuit in accordance with the invention.

Referring to FIG. 6, an exemplary application of the lighting control panel 100 is illustrated in block diagram form. Particularly, the block diagram is simplified to include only certain elements of the overall control panel 100.

The illustrative system includes analog inputs in the form of a potentiometer 400 and a photocell 402. The potentiometer will generate an analog voltage signal dependent on position of the potentiometer. The potentiometer 400 is connected to the first analog input 320-1. The photocell 402 likewise generates an analog voltage signal representing light level, or the like. This signal is supplied to the second analog input 320-2. The analog input ports 320 are connected to the I/O controller 124, as discussed above relative to FIG. 5.

The I/O controller 124 is connected via the analog output ports 326-1 and 326-2 to respective dimmers 404 and 406. The dimmers 404 and 406 drive respective first and second analog load devices 408 and 410. Power to the dimmers 404 and 406 may be provided by remote operated devices 110-1 and 110-2 in the form of relay devices. The dimmers 404 and 406 adjust the level of power supplied to the analog load devices 408 and 410, respectively, based on command signals received from the I/O controller 124.

In accordance with the invention, the I/O controller includes suitable programming for controlling operation of the dimmers 404 and 406. The dimming to either load 408 or 410 can be controlled based on any one of the potentiometer 400, the photocell 402 or a preselect programmed value in a schedule stored in the I/O controller 124, particularly the memory 146M, see FIG. 5. For example, light level could be controlled based on time of day, day of the week, ambient light levels, or user command, as necessary or desired.

Thus, in accordance with the invention, there is provided a lighting control system including analog ports for selectively controlling analog load devices.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

We claim:

1. An electrical distribution system for selectively connecting an electrical power source to load devices, comprising:
   a panel;
   a plurality of switching devices mounted in the panel each electrically connectable between an electrical power source and a load device for selectively delivering electrical power to the load device;
   a control system for controlling operation of the switching devices, the control system comprising a programmed controller for commanding operation of the switching devices, the control system including analog ports for selectively controlling analog load devices.

2. The electrical distribution system of claim 1 wherein the control system comprises a plurality of analog output ports.

3. The electrical distribution system of claim 2 further comprising analog output circuits connected between the programmed controller and the analog output ports.

4. The electrical distribution system of claim 3 wherein the programmed controller develops a pulse width modulated (PWM) output signal and the analog output circuits convert the PWM signal to a DC voltage.

5. The electrical distribution system of claim 1 wherein the control system comprises a plurality of analog input ports.

6. The electrical distribution system of claim 5 further comprising analog input buffers connected between the programmed controller and the analog input ports.

7. The electrical distribution system of claim 1 wherein the analog ports comprise an analog input port and an analog output port.

8. The electrical distribution system of claim 7 wherein the programmed controller controls the analog output port responsive to an analog input command received at the analog input port.

9. The electrical distribution system of claim 7 wherein the programmed controller controls the analog output port in accordance with a programmed schedule.

10. The electrical distribution system of claim 7 wherein the programmed controller controls a select one of the plurality of switching devices to selectively apply power to a select analog load device connected to the analog output.

11. An electrical distribution system for selectively connecting an electrical power source to load devices, comprising:
   a panelboard having a plurality of load circuit positions;
   a plurality of pairs of circuit breakers and switching devices each mounted in one of the load circuit positions, and each pair electrically connectable between an electrical power source and a load device for selectively delivering electrical power to load devices;
   an input/output (I/O) controller mounted in the panelboard for controlling operation of the switching devices, the I/O controller comprising a programmed controller for commanding operation of the switching devices, the control system including analog ports for selectively controlling analog load devices.

12. The electrical distribution system of claim 11 wherein the control system comprises a plurality of analog output ports.

13. The electrical distribution system of claim 12 further comprising analog output circuits connected between the programmed controller and the analog output ports.

14. The electrical distribution system of claim 11 wherein the control system comprises a plurality of analog input ports.

15. The electrical distribution system of claim 14 further comprising analog input buffers connected between the programmed controller and the analog input ports.

16. The electrical distribution system of claim 13 wherein the programmed controller develops a pulse width modulated (PWM) output signal and the analog output circuits convert the PWM signal to a DC voltage.

17. The electrical distribution system of claim 11 wherein the analog ports comprise an analog input port and an analog output port.

18. The electrical distribution system of claim 17 wherein the programmed controller controls the analog output port responsive to an analog input command received at the analog input port.

19. The electrical distribution system of claim 17 wherein the programmed controller controls the analog output port in accordance with a programmed schedule.

20. The electrical distribution system of claim 17 wherein the programmed controller controls a select one of the plurality of switching devices to selectively apply power to a select analog load device connected to the analog output.

* * * * *